RECORDING APPARATUS

Filed Feb. 6, 1956 2 Sheets-Sheet 1

INVENTORS
RICHARD G. LEITNER,
JACOB RABINOW,
BY Smyth & Roston
ATTORNEYS

INVENTORS
RICHARD G. LEITNER.
BY JACOB RABINOW.
Smyth & Roston
ATTORNEYS

United States Patent Office 2,914,610

Patented Nov. 24, 1959

2,914,610

RECORDING APPARATUS

Richard G. Leitner, Los Angeles, Calif., and Jacob Rabinow, Washington, D.C., assignors to Telautograph Corporation, Los Angeles, Calif., a corporation of Virginia Application February 6, 1956, Serial No. 563,695

2 Claims. (Cl. 178—19)

This invention relates to telescribing apparatus and more particularly to apparatus for automatically recording at a receiving station messages transcribed at a transmitting station. Certain features of the invention are also adapted to be used in various types of apparatus in which messages are made available in coded or decoded form for recording.

In our modern society, communication between different people and different organizations is desirable. The communication may be in various forms such as by telephone. However, the use of such forms of communication as the telephone has certain disadvantages. For example, problems arise when one person is attempting to send a message simultaneously to a plurality of people at a number of different stations in a large manufacturing plant or in a commercial establishment such as a department store. The use of such forms of communication as the telephone is also unsatisfactory in such operations as banks where signatures of customers have to be quickly verified.

Because of the problems involved sometimes in the use of such forms of communication as the telephone, telescribing apparatus has been constructed. The telescribing apparatus includes transcribing and receiving equipment. The transcribing apparatus includes means for producing signals having variable characteristics in accordance with the movements of a stylus relative to a tablet. These signals are transmitted to a receiving station and are decoded at the receiving station to produce signals for controlling the movements of a stylus at the receiving station. By using the control signals to produce movements of the stylus at the receiving station, the stylus at the receiving station is made to follow the stylus at the transmitting station to produce a duplicate of the message being recorded at the transmitting station.

This invention provides apparatus for producing signals modulated in frequency to represent the movements of a stylus at a transmitting station. The frequency modulated signals are transmitted through a closed loop to produce within the space enclosed by the loop magnetic flux having frequency characteristics related to the characteristics of the transmitted signals. The magnetic flux threads an inductive member disposed within the loop and induces in the member signals having frequency characteristics related to the frequency characteristics of the magnetic flux. The induced signals are decoded to produce signals having an amplitude variable in accordance with the variations in the frequency of the induced signals. The signals having the variable amplitude are used to control the positioning of a stylus at the receiving station.

The stylus at the receiving station is adapted to record messages without having to use any ink. The messages are recorded without any need for ink by using a stylus made from a conductive material having a high melting temperature. The stylus is provided with a sharp tip in contact with a recording medium.

The recording medium is made from a transparent backing having non-conductive properties and a thin opaque coating having conductive properties. By using such a stylus and such a recording medium, a flow of current is obtained between the stylus and the conductive coating. The flow of current is localized at the position of contact between the stylus and the coating to produce sufficient heat for evaporating the coating at this position.

Since the stylus at the receiving station is moved in accordance with the movements of the transmitting stylus, a transparent message is produced on the recording medium against the opaque background formed by the conductive coating. Means may also be included in association with the receiving stylus to insure that the message is properly recorded for any variations in the positioning of the stylus. This message may be projected against a lighted background to indicate the message in enlarged form.

As will be seen from the subsequent discussion, the use of a conductive stylus and a recording medium formed from a non-conductive backing and a conductive coating may be carried over into other fields in addition to telescribing apparatus. For example, the stylus and recording medium may be used in data processing systems to record numerical values in digital form. The stylus and recording medium may also be used in such other fields as oscillographs and sound recordings.

Figures 3, 4, 5, 6:
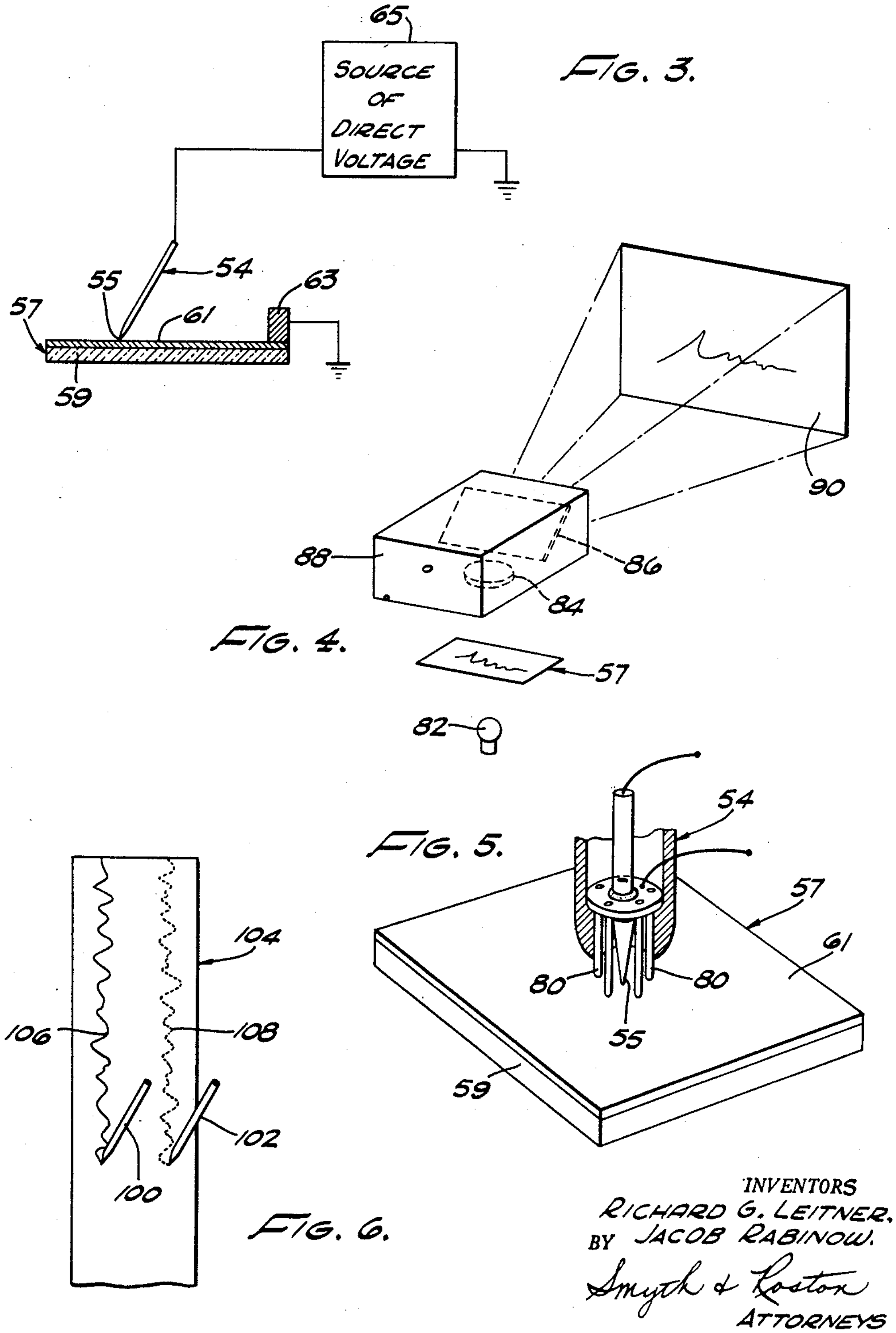
Figure 3 is a view, partly in block form and partly in section, somewhat schematically illustrating the stylus shown in Figure 2 and a recording medium associated with the stylus to indicate the movements of the stylus.
Figure 4 is a perspective view somewhat schematically illustrating the recording medium shown in Figure 3 and further illustrating apparatus associated with the medium for projecting the image recorded on the medium to provide an enlarged representation.

Figure 5 is an enlarged, fragmentary, perspective view of the recording medium shown in Figures 3 and 4 and of a modified stylus arrangement for insuring the recording of the stylus movements for any variations in the positioning of the stylus; and Figure 6 is a fragmentary perspective view of a recording medium similar to that shown in the previous figures and of a pair of styluses for simultaneously recording messages easily distinguishable from each other.

Figures 1, 2:
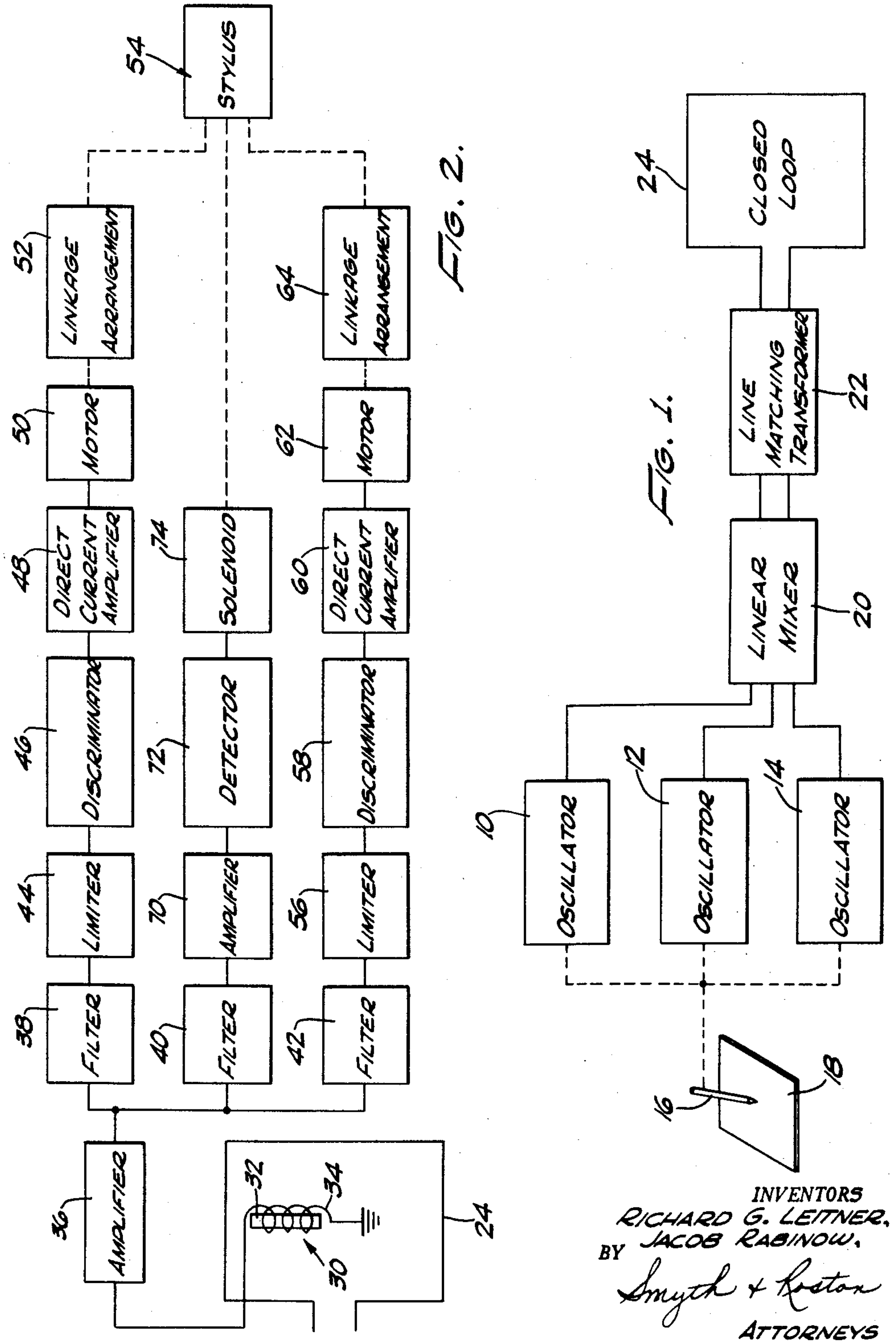
Figure 1 is a view, partly in block form and partly in perspective, somewhat schematically illustrating apparatus for generating and transmitting signals having characteristics related to the movements of a stylus at a transmitting station.
Figure 2 is a view, partly in block form, somewhat schematically illustrating a portion of the apparatus shown in Figure 1 and apparatus for receiving and decoding the signals transmitted by the apparatus shown in Figure 1 and for using the signals to control the positioning of a stylus at a receiving station.

In the embodiment of the invention shown in the drawings, a transmitter is shown in block form in Figure 1 and is provided with a plurality of oscillators 10, 12 and 14. The oscillator 10 is adapted to produce signals having an intermediate frequency of approximately 1,700 cycles per second. The oscillator 10 is also adapted to produce signals having a frequency variable through a range of approximately 50 cycles on each side of the intermediate frequency. The signals are variable in accordance with the displacements of a stylus 16 relative to a tablet 18 along an axis extending from the lower left corner to the upper right corner of the tablet in Figure 1. The oscillator 10 may be constructed in accordance with circuit details disclosed in co-pending application Serial No. 552,542, filed December 12, 1955, by Carl F. Anderson and James A. Maize.

The oscillator 14 is adapted to provide signals having an intermediate frequency of approximately 2,300 cycles per second. The signals from the oscillator 14 are also adapted to vary through a range of approximately 50 cycles on each side of the intermediate frequency. The frequency of the signals from the oscillator 14 is variable in accordance with the movements of the stylus 16 relative to the tablet 18 along an axis extending from the lower right corner to the upper left corner of the stylus. The oscillator 14 may be constructed in a manner similar to that disclosed in co-pending application Serial No. 552,542.

The oscillator 12 is adapted to provide signals having a suitable frequency such as approximately 1,400 cycles per second when the stylus 16 is pressed into contact with the tablet 18. The oscillator 12 is also adapted to provide signals having a suitable frequency such as approximately 1,300 cycles per second upon a movement of the stylus away from the tablet 18. The oscillator 12 may be constructed in a manner similar to that disclosed in co-pending application Serial No. 552,542.

The signals from the oscillators 10, 12 and 14 are applied to input terminals of a linear mixer 20. Output terminals of the mixer 20 are connected to input terminals of a line matching transformer 22. The output from the transformer 22 is in turn applied to a conductor 24 extending in a closed loop from the transformer 22. The conductor 24 may have characteristics for producing magnetic flux upon the flow of current through the conductor. The conductor 24 is shown in Fig. 1 as having only one branch. However, it should be appreciated that a plurality of branches may be connected in parallel in order to obtain good magnetic coverage of the area enclosed by the conductor.

Receiving apparatus is shown in block form in Figure 2. The receiving apparatus includes an inductive member generally indicated at 30. The inductive member 30 is formed from a core 32 made from a suitable magnetic material and from a coil 34 wound on the core. One terminal of the coil 34 may be grounded and the other terminal of the coil is connected to an input terminal of an amplifier 36, which may be formed from one or more stages. The output signals from the amplifier 36 are applied to filters 38, 40 and 42.

The filter 38 is provided with characteristics to pass signals only in the range of approximately 1,650 to 1,750 cycles per second. The signals from the filter 38 are applied to a limiter 44, which may be formed from one or more over-driven amplifier stages. The output from the limiter 44 passes to the input terminals of a discriminator 46 adapted to produce signals having an amplitude variable in accordance with the variations in the frequency of the signals passing through the filter 38. A connection is made from the output terminal of the discriminator 46 to the input terminal of a direct current amplifier 48. The limiter 44, the discriminator 46 and the amplifier 48 may be constructed in a manner similar to that disclosed in co-pending application Serial No. 552,542.

The signals from the amplifier 48 control the operation of a motor 50, which is mechanically coupled through a linkage relationship 52 to a stylus 54. The mechanical coupling between the motor 50 and the linkage arrangement 52 and between the linkage arrangement and the stylus 54 is shown in Figure 2 by broken lines. The motor 50, the linkage arrangement 52 and the stylus 54 are shown in block form in Figure 2. The motor 50, the linkage 52 and the stylus 54 may be constructed in a manner similar to that disclosed in Lauder et al. Patent No. 2,355,087.

The filter 42 is provided with characteristics to pass signals in the range of frequency between approximately 2,250 and 2,350 cycles per second. The signals from the filter 42 are applied to a limiter 56, which may be constructed in a manner similar to the limiter 44. The output signals from the limiter 56 in turn pass to a discriminator 58, which may be constructed in a manner similar to the discriminator 46. A direct current amplifier 60 in turn receives the signals from the discriminator 58. The amplifier 60 may be constructed in a manner similar to the amplifier 48.

The output signals from the amplifier 60 are applied to a motor 62 to control the operation of the motor. The motor 62 is coupled to the stylus 54 through a linkage arrangement indicated in block form at 64. The linkage arrangement 64 may be constructed in a manner similar to that disclosed in Lauder et al. Patent No. 2,355,087. Mechanical coupling between the motor 62 and the linkage arrangement 64 and between the linkage arrangement and the stylus 54 is indicated by broken lines in Figure 2.

The construction of the stylus 54 is shown schematically in Figure 3. The stylus 54 may be made from a hard material such as osmium or tungsten having a high melting temperature. The stylus 54 may be provided with a shank portion having a suitable diameter such as approximately 0.05 inch and with a portion tapering downwardly to a pointed tip 55. The tip 55 may be highly polished and may be provided with a mechanical configuration having a suitable radius such as in the range of 0.003 inch to 0.010 inch. The stylus 54 is disposed in contact with a recording medium generally indicated at 57. The recording medium 57 may be disposed in a flat plane having a relatively small area such as an area of approximately ½ inch by ½ inch. Since the tip 55 of the stylus 54 is rounded, the tip 55 can be made to move smoothly over the recording medium 57 without scratching the medium.

The recording medium 57 may be formed in part from a backing 59 made from a transparent non-conductive material such as that designated as "Mylar" by E. I. du Pont de Nemours and Company. A thin opaque coating 61 having conductive properties is disposed on the backing 59. The coating 61 may be made from a suitable material such as aluminum. The recording medium 57 formed from the backing 59 and the coating 61 may be similar to material used in making capacitances and may be purchased from such companies as Coating Products Corporation of Englewood, New Jersey. A bar 63 extends across the lateral dimension of the coating 61 at one end of the coating to connect the coating to ground. A direct voltage is applied to the stylus 54 from one terminal of a source 65 of direct voltage. Another terminal of the voltage source 65 is grounded. As will become more apparent subsequently, an alternating voltage may be applied to the stylus 54 instead of a direct voltage.

An amplifier 70 (Figure 2) formed from one or more stages is connected to the filter 40 to receive the signals passing through the filter. The signals from the amplifier 70 in turn pass to a detector 72 for converting alternating signals into a direct voltage. The direct voltage produced by the detector 72 is introduced to a solenoid 74. The solenoid 74 controls the positioning of the stylus 54 in contact with or out of contact with the recording medium 58. The amplifier 70, the detector 72 and the solenoid 74 may be constructed in a manner similar to that described in co-pending application Serial No. 552,542.

It should be appreciated that the amplifier 70, the detector 72 and the solenoid 74 are included only by way of illustration. For example, these stages may be replaced by a switch connected to the voltage source 65. The switch may be normally open and may become closed when the stylus 16 is pressed against the tablet 18.

Certain members may be included to insure the proper recording of messages on the recording medium 57. These members include a plurality of electrodes 80 (Figure 5) associated with the stylus 54. The electrodes 80 may be disposed at spaced intervals around the periphery of a circle, the center of which is occupied by the stylus 54. The circle defined by the electrodes 80 may have a suitable diameter such as approximately 0.1 inch when the recording medium occupies an area of approximately ½ inch by ½ inch. The electrodes 80 may be suitably supported by the stylus 54 for movement with the stylus. However, the electrodes 80 are suitably insulated from the stylus 54 such that the electrodes can be grounded.

Apparatus may also be associated with the recording medium 57 to facilitate the visual representation of the message recorded on the medium. The apparatus includes a light source 82 disposed on one side of the recording medium 58 such as below the medium. A lens 84 may be positioned on the other side of the medium 58 to focus the light passing through the medium. The lens 84 and a mirror 86 may be included in a projector 88. The mirror 88 may be inclined at a proper angle to project the image from the recording medium 58 toward a screen 90.

The oscillator 10 produces signals having a suitable intermediate frequency such as 1,700 cycles per second when the stylus 16 is positioned relative to the tablet 18 at an intermediate distance along the axis extending from the lower left corner to the upper right corner of the tablet in Figure 1. The signals from the oscillator 10 become varied from the frequency of 1,700 cycles per second upon a movement of the stylus 16 from the intermediate position along the axis extending from the lower left corner to the upper right corner of the tablet 18 in Figure 1.

The frequency of the signals from the oscillator 10 decreases below a value of 1,700 cycles per second when the stylus 18 is moved toward the lower left corner of the tablet 18 in Figure 1. The frequency of the signals from the oscillator 10 decreases below a value of 1,700 cycles per second by an amount related to the distance through which the stylus 16 is moved from the intermediate position toward the lower left corner of the tablet 18.

Similarly, the frequency of the signals from the oscillator 10 increases above the intermediate value of 1,700 cycles per second when the stylus 16 is moved from the intermediate position toward the upper right corner of the tablet 18 in Figure 1. In this way, the frequency of the signals from the oscillator 10 is related at any instant to the disposition of the stylus 16 relative to the tablet 18 along the axis extending from the lower left corner to the upper right corner of the tablet.

In like manner, the oscillator 14 produces signals having a suitable intermediate frequency such as 2,300 cycles per second when the stylus 16 is positioned at an intermediate distance relative to the tablet 18 along the axis extending from the lower right corner ot the upper left corner of the tablet. The frequency of the signals produced by the oscillator 14 becomes varied from the intermediate value of 2,300 cycles per second when the stylus 16 is moved from the intermediate position along the axis extending from the lower right corner to the upper left corner of the tablet 18. The frequency of the signals produced by the oscillator 14 becomes varied by an amount dependent upon the distance through which the stylus 16 has been moved along the axis extending from the lower right corner to the upper left corner of the tablet 18. In this way, the position of the stylus 16 is defined at any instant by the frequencies of the signals from the oscillators 10 and 14.

The oscillator 12 produces signals at only two frequencies. The oscillator 12 produces signals at a first suitable frequency such as approximately 1,400 cycles per second during the time that the stylus 16 is contacting the tablet 18. Upon a movement of the stylus 16 away from the tablet 18, a switch may become closed to insert a capacitance into the oscillator. This causes the frequency of the signals from the oscillator 12 to decrease to a suitable value such as approximately 1,300 cycles per second. The frequency of approximately 1,300 cycles per second indicates that a message is not actually being transcribed on the tablet 18 even though the stylus 16 may be moved relative to the tablet to produce variations in the frequencies of the signals from the oscillators 10 and 14. As described previously, the oscillator 12 would not have to be included if a switch is included to control the imposition of voltage from the source 65. This switch would become closed only when the stylus 16 is pressed against the tablet 18.

The signals from the oscillators 10, 12 and 14 are introduced to the linear mixer 20. The mixer combines the signals from the oscillators 10, 12 and 14 without changing the frequency of the signals and without producing beat frequency signals which might otherwise result from a combination of signals at two different frequencies. The signals from the mixer 20 are then introduced to the transformer 22, which operates to change the impedance presented to the signals such that the output impedance of the transformer corresponds to the impedance presented to the transformer by the closed loop 24. By producing a match in impedances between the transformer 22 and the conductor 24, an optimum flow of current can be obtained in the conductor.

When current flows through the conductor 24, the conductor produces magnetic flux. The flux extends through all of the area enclosed by the conductor 24. The flux has frequency characteristics corresponding to the frequency characteristics of the signals from the oscillators 10, 12 and 14. The flux links the core 32 of the inductive member 30 since the inductive member is disposed within the closed loop formed by the conductor 24. This causes alternating signals to be induced in the coil 34. The alternating signals induced in the coil 34 have frequency characteristics corresponding to the frequency characteristics of the alternating flux produced by the conductor 24.

The signals produced by the coil 34 may be amplified by the amplifiers 36 and introduced to the filters 38, 40 and 42. As previously described, the filter 38 has characteristics for passing signals only in the range of frequencies between approximately 1,650 and 1,750 cycles per second. This causes the filter 38 to pass only the signals produced as a result of the operation of the oscillator 10. In this way, the signals passing through the filter 38 represents the disposition of the stylus 16 at any instant along the axis extending from the lower left corner to the upper right corner of the tablet 18.

The signals passing through the filter 38 are introduced to the limiter 44. The limiter 44 is formed from one or more amplifier stages having over-driven characteristics. By over-driving the signals from the filter 38, the signals from the filter are converted into signals having essentially a square wave regardless of the amplitudes of the signals passing through the filter. Because of its over-driven characteristics, the limiter 44 operates to make the amplitude of the signals constant so that only the frequency of the signals have variable characteristics.

The signals from the limiter 44 pass to the discriminator 46. The discriminator 46 operates to convert the signals into a direct voltage having an amplitude related to the frequency of the signals introduced to the discriminator. The discriminator 46 operates to produce the direct voltage by using a push-pull stage balanced to give equal outputs on each side of the push-pull arrangement for an intermediate frequency of 1,700 cycles per second.

When the frequency of the signals rises above 1,700 cycles per second, one side of the push-pull stage becomes predominant to produce a voltage having an amplitude greater than the voltage produced by the other side. This causes a resultant voltage to be produced having an amplitude dependent upon the extent of the unbalance and having a polarity which may be considered as positive. The second side of the push-pull stage becomes predominant when the frequency of the signals falls below 1,700 cycles per second. This causes a voltage to be produced having a negative polarity and an amplitude dependent upon the extent of unbalance between the output of the two sides of the push-pull stage.

The signals from the discriminator 46 are introduced to the amplifier 48. The amplifier 48 operates to produce a bias voltage for positioning the stylus 54 at a particular position relative to the recording medium 57 along a first axis. This axis corresponds to the axis extending from the lower left corner to the upper right corner of the tablet 18 in Figure 1. The amplifier 48 also operates to produce a signal having variations in amplitude related to the movements of the stylus 54 along the first axis. This signal may be considered as an alternating signal having a relatively low frequency such as six cycles per second corresponding to the frequency at which the stylus 16 at the transmitting station is moved manually.

The signals from the amplifier 48 are introduced to the motor 50 to control the operation of the motor. The motor 50 in turn drives the stylus 54 through the linkage arrangement 52. Because of the particular arrangement of linkages, the motor 50 drives the stylus 54 only along an axis extending from the lower left corner to the upper right corner of the recording medium 57. The motor 50 drives the stylus along this axis through a distance directly related to the amplitude of the signals from the amplifier 48. The construction and operation of the motor 50 and the linkage arrangement 52 in driving the stylus 54 is fully shown and described in Lauder et al. Patent No. 2,355,087.

Just as the filter 38 passes signals only in the range between approximately 1,650 to 1,750 cycles per second, the filter 42 passes signals only in the range between approximately 2,250 and 2,350 cycles per second. The signals are amplified on an over-driven basis by the limiter 56 to produce signals having substantially a square wave. The signals are then detected by the discriminator 58 to produce a voltage having an amplitude directly related to the frequency of the signals from the limiter 56. The direct voltage produced by the discriminator 58 is amplified and introduced to the motor 62 to drive the motor in accordance with the amplitude of the voltage. The motor 62 in turn drives the stylus 54 through the linkage arrangement 64. The motor 62 drives the stylus 54 along an axis corresponding to the axis extending from the lower right corner to the upper left corner of the tablet 18 in Figure 1. The motor 62 drives the stylus 54 along this axis through a distance directly related to the amplitude of the voltage from the amplifier 60.

During the time that the stylus 54 is contacting the conductive coating 61 of the recording medium 57, current flows through a circuit including the voltage source 65, the stylus, the recording medium and the bar 63 in Figure 3. The current is localized at the position of contact between the stylus 54 and the conductive coating 61. Since the stylus 54 is provided with the pointed tip 55, the current density is relatively large at the position of contact between the tip 55 and the conductive coating 61. This causes a large amount of heat to be generated by the flow of current at the position in which the stylus 54 contacts the conductive coating 61.

The heat generated at the position of contact between the stylus 54 and the coating 61 is sufficiently great to produce an evaporation of the coating at this position. A large amount of heat is generated in the conductive coating 61 only at the position of contact between the coating and the stylus 54 since the current is able to flow through the complete cross-sectional area of the coating at every position between the stylus 54 and the bar 63. Because of the flow of current through the complete cross-sectional area of the conductive coating 61 at the positions between the stylus 54 and the bar 63, the amount of heat generated in the coating per unit area is relatively low and is insufficient to produce an evaporation of the coating material.

It will be seen from the previous paragraph that the coating 61 becomes evaporated only at the positions in which the stylus 54 is contacting the coating. This causes the transparent backing 59 to become apparent at the positions of contact between the stylus 54 and the conductive coating 61. The transparent backing 60 becomes apparent against the opaque background formed by the conductive coating 61. Because of this, the movements of the stylus 54 over the coating 61 can be clearly seen to indicate the message being recorded. The movements of the stylus 54 over the coating 61 occur without any scratching of the coating or of the backing 59 since the tip 55 of the stylus is rounded.

The visual presentation of the message recorded by the movements of the stylus 54 is facilitated by the operation of the apparatus shown in Figure 4. This results from the operation of the light source 82 in directing the message toward the mirror 86 and the operation of the mirror in projecting the light toward the screen 90. The image seen on the screen 90 is an enlarged reproduction of the message recorded on the conductive backing 62.

It may sometimes happen that the stylus 54 may be moved through closed loops such as circles and rectangles. When the stylus 54 describes a closed loop, the coating 61 within the loop becomes electrically isolated from the coating outside of the loop because of the evaporation of the conductive material along the line defining the loop. Since the stylus 54 is positioned within the colsed loop, the continuous circuit from the stylus through the conductive coating 61 to the bar 63 might become interrupted. This would prevent the movements of the stylus 54 within the closed loop from being recorded on the medium 57 because of the failure of any point on the conductive coating 62 to become evaporated.

The electrodes 80 may be included to insure that the movements of the stylus 54 will be properly recorded even when the stylus has described a closed loop. The electrodes 80 are sufficiently separated from the stylus 54 to be positioned outside of the loop during the time that the stylus is positioned within the loop. For this reason, current flows through a continuous circuit including the voltage source 65, the stylus 54, the electrode or electrodes 80 within the loop, the electrode or electrodes 80 outside of the loop, the conductive coating 61 and the bar 63. The flow of current between the electrodes 80 and the conductive coating 61 cannot produce any evaporation of the coating since the electrodes are relatively blunt. This causes the current density per unit area of contact between the electrodes and the conductive coating 61 to be below the level required to produce evaporation of the coating. In this way, the coating 61 becomes evaporated only at the positions in which the stylus 54 contacts the coating.

The stylus 54 contacts the coating 61 to produce a recording of information only during the time that the stylus 16 is contacting the tablet 18. When the stylus 16 contacts the tablet 18, signals at a suitable frequency such as 1,400 cycles per second are produced by the oscillator 12 in a manner similar to that described above. These signals are unable to pass through the filter 40 at the receiving station. Since no signals pass through the filter 40, the solenoid 74 cannot become energized to move the stylus 54 away from the conductive coating 61. Because of the continued contact between the stylus 54 and the conductive coating 62, the movements of the stylus are recorded on the medium 57.

When the stylus 16 is moved away from the tablet 18, signals having a suitable frequency such as 1,300 cycles per second are generated by the oscillator 12. These signals have a frequency for passage through the filter 40 at the receiving station. The signals passing through the filter are amplified and are then converted by the detector 72 into a direct voltage. This voltage causes the solenoid 74 to become energized such that the solenoid moves the stylus 54 out of contact with the conductive coating 61. Since the stylus 54 is not contacting the conductive coating 61, the movements of the stylus cannot be recorded on the medium 57.

As described previously, certain stages such as the oscillator 12 in Figure 1 and the filter 40, the amplifier 70, the detector 72 and the solenoid 74 are included only by way of illustration. These stages may be replaced by a switch disposed below the tablet 18 in Figure 1 to become closed when the stylus 16 is pressed against the tablet. The switch may be included in a circuit with the voltage source 65 and the stylus 54 to provide for the introduction of voltage to the stylus only when the switch becomes closed. By including the switch, messages would be produced by the stylus 54 on the recording medium 57 only during the time that a message is being transcribed by the stylus 16 on the tablet 18.

The combination of the conductive stylus 54 and the recording medium 57 may be used in other ways in addition to their use in telescribing apparatus. For example, the conductive stylus 54 and the recording medium 57 may be used in data processing systems using digital techniques. Such systems generally employ binary codes in which the recording of a mark at a particular position may indicate a binary value of "1" and the failure to record a mark at a particular position may indicate a binary value of "0."

The conductive stylus 54 and the recording medium 57 may also be used in other ways than those described above. For example, the stylus 54 and the recording medium 57 may be used to record signals as in an oscillograph or to record sound tracks. In such types of recording, it may be desired to produce more than one record at once. In producing at least a pair of records, it may be desired to provide a simple delineation between the different records.

Figure 6 illustrates one way in which a pair of records may be traced by styluses 100 and 102 on a recording medium 104 corresponding to the recording medium 57 in the previous figures. The stylus 100 may have a direct voltage applied to it in a manner similar to the application of direct voltage to the stylus 54 in Figure 3. Because of this, a continuous message indicated at 106 is transcribed by the stylus 100 on the recording medium 104.

The stylus 102 may have an alternating signal applied to it at a suitable frequency such as 60 cycles per second. Since the conductive coating becomes evaporated only upon the generation of heat above a particular level, signals tend to become recorded only during the peak amplitudes of the alternating signals. During the other portions of the alternating signals, the heat generated by the signals is insufficient to produce any evaporation of the coating. This causes the message recorded by the stylus 102 to be represented by a plurality of finite dots separated by small gaps. This is illustrated at 108 in Figure 6.

It should be appreciated that alternating signals can be applied to both of the styluses 100 and 102 at different frequencies. For example, alternating voltage at a frequency of 60 cycles per second can be applied to the stylus 100 and alternating voltage at a frequency of 400 cycles per second can be applied to the stylus 102. This would cause the discrete markings made by the stylus 100 to be spaced considerably closer together than the discrete markings made by the stylus 102. Because of this, the markings made by the stylus 100 would be easily distinguishable from the markings made by the stylus 102. It should also be appreciated that more than two styluses can be used and that voltages having individual characteristics can be applied to each stylus to provide a delineation in the movements of the stylus.

There is thus provided telescribing apparatus for recording at a receiving station a message transcribed at a transmitting station. One feature of the apparatus constituting this invention is the use of inductive techniques to transmit the signals representing the message and to receive the transmitted signals. Another feature of the apparatus is the recording of the message by the flow of current from a stylus through a recording medium. This feature can be used in other apparatus as well as telescribing apparatus.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. An improvement in telescribing equipment in which manual movement of a remote stylus by an operator in creating written messages is reproduced at a receiving station, comprising a stylus having a pointed electrically conductive tip, a plurality of electrically conductive electrodes supported by the stylus and movable therewith, the electrodes being electrically insulated from the stylus tip but electrically connected to each other, the electrodes being clustered around the tip but spaced therefrom, a flat recording medium having a transparent non-conductive backing and a thin opaque conductive surface coating, the stylus tip and associated electrodes normally contacting the conductive coating, means for inducing a current flow between the tip and coating, the current flow producing local heating at the tip sufficient to remove the coating, whereby movement of the stylus produces a transparent trace on the recording medium, means for moving the stylus and associated tip across the coated surface of the recording medium in response to movement of the remote stylus by the operator, and means for projecting an enlarged image of the trace by passing light therethrough.

2. An improvement in telescribing equipment in which manual movement of a remote stylus by an operator in creating written messages is reproduced at a receiving station, comprising a stylus having a pointed electrically conductive tip, a flat recording medium having a transparent non-conductive backing and a thin opaque conductive surface coating, the stylus tip normally contacting the conductive coating, means for inducing a current flow between the tip and coating, the current flow producing local heating at the tip sufficient to remove the coating, whereby movement of the stylus produces a transparent trace on the recording medium, means for moving the stylus and associated tip across the coated surface of the recording medium in response to movement of the remote stylus by the operator, and means for projecting an enlarged image of the trace by passing light therethrough.

References Cited in the file of this patent

UNITED STATES PATENTS

| | | |
|---|---|---|
| 912,181 | Schattner | Feb. 9, 1909 |
| 1,544,871 | Tiffany | July 7, 1925 |
| 2,274,638 | Rosene | Mar. 3, 1942 |
| 2,275,898 | Goldsmith | Mar. 10, 1942 |
| 2,346,670 | Engler et al. | Apr. 18, 1944 |
| 2,462,904 | Rosen | Mar. 1, 1949 |
| 2,748,487 | Zimmermann | June 5, 1956 |